United States Patent
Cordes et al.

(10) Patent No.: US 8,842,742 B2
(45) Date of Patent: Sep. 23, 2014

(54) FRAME-RATE CONVERSION

(75) Inventors: Claus Nico Cordes, Eindhoven (NL); Dmitry Nikolaevich Znamenskiy, Eindhoven (NL)

(73) Assignee: Entropic Communications, Inc., San Diego, CA (US)

( * ) Notice: Subject to any disclaimer, the term of this patent is extended or adjusted under 35 U.S.C. 154(b) by 348 days.

(21) Appl. No.: 12/838,248

(22) Filed: Jul. 16, 2010

(65) Prior Publication Data

US 2011/0019083 A1  Jan. 27, 2011

(30) Foreign Application Priority Data

Jul. 27, 2009  (EP) .................................. 09166520

(51) Int. Cl.
 *H04N 21/43* (2011.01)
 *H04N 7/01* (2006.01)

(52) U.S. Cl.
 CPC ............ *H04N 7/0112* (2013.01); *H04N 7/0127* (2013.01)
 USPC .................... 375/240.28; 348/441; 348/231.5

(58) Field of Classification Search
 USPC ............................................. 348/231.5, 441
 See application file for complete search history.

(56) References Cited

U.S. PATENT DOCUMENTS

| | | | | |
|---|---|---|---|---|
| 2006/0190809 | A1* | 8/2006 | Hejna, Jr. | 715/500.1 |
| 2007/0237227 | A1* | 10/2007 | Yang et al. | 375/240.12 |
| 2008/0166115 | A1* | 7/2008 | Sachs et al. | 396/55 |

FOREIGN PATENT DOCUMENTS

| | | |
|---|---|---|
| EP | 1874055 A2 | 1/2008 |
| WO | 2008 081386 A1 | 7/2008 |

* cited by examiner

*Primary Examiner* — Jefferey Harold
*Assistant Examiner* — Justin Sanders
(74) *Attorney, Agent, or Firm* — Richard Bachand; Duane Morris LLP

(57) ABSTRACT

A method of generating presentation time stamps, PTSs, for motion-compensated frame-rate conversion of a sequence of frames. In one aspect, the method comprises for each new frame: determining an average difference between the capture time-stamps of recent consecutive new frames; and generating the PTS based on the capture time-stamp of a previous new frame and the average difference. In another aspect, the method comprises detecting a first cadence and a second different cadence in the sequence of frames; and generating a PTS for each new frame defined by the first cadence, such that in each case the difference between the PTSs of consecutive new frames is intermediate between the true interval between those frames according to the first cadence and the true interval between them according to the second cadence.

12 Claims, 3 Drawing Sheets

FRAME-RATE CONVERSION

This invention relates to frame-rate conversion FRC for sequences of moving-pictures, especially Up Conversion (UPC) in which temporal interpolation is used to synthesise additional images. The invention relates in particular to Motion Compensated FRC (MC-FRC), in which the motion of objects between frames is accounted for in the interpolation process.

Modern televisions (TVs), such as Liquid Crystal Display (LCD) TVs can operate at picture frequencies of up to 120 Hz or more. However, the picture frequency of recorded and broadcast audio-visual content is typically much lower. For film material, it is often 24, 25 or 30 frames per second (fps). For content captured on mobile phones, digital cameras or Personal Digital Assistants (PDAs), it could be as low as 12 fps or 15 fps.

To show this kind of content on a standard 60/50 fps TV, frame-rate conversion can be applied. One simple and cheap known way of implementing FRC is to repeat original frames according to a periodic pattern. This pattern is sometimes referred to as the "cadence" or "pull-down" of the content.

The most common pull-downs are 2:2 for 25 fps to 50 fps conversion (used in Europe) and 3:2 for 24 fps to 60 fps conversion (used in the United States). Here, 2:2 denotes the repetition of every frame twice: that is, two sequential frames AB are converted to four as AABB. Similarly, 3:2 denotes alternating repetition with one frame repeated three times and the next repeated twice: converting AB to AAABB.

Other film cadences that can be found in consumer electronics are DVCPro 24 fps to 60 fps conversion with pull-downs of 2:3:3:2 and 2:2:2:4; Vari-speed broadcasts with 3:2:3:2:2; "animation" content with 5:5 and 6:4; and "anime" content with 8:7. More exotic periodic pull-down patterns exist, for example, in slow motion on sport channels. In one case, a pull-down of 2:3:2:2:2:3:2:1:3 has been observed in a captured TV broadcast signal. Lastly, irregular or a-periodic pull-downs can also be observed. These may be caused, for example, by changes in slow motion rate.

As a further complication, hybrid material also exists. This is material in which multiple different cadences exist simultaneously, in different spatial parts of each frame in the sequence. An example of this is the co-existence of film and video (1:1 pull-down) in the same picture, which frequently occurs in film material with added graphical overlays having video cadence. By way of example, the film material may be the main part of picture, and the graphical overlay may be a scrolling text bar. In this case, both parts of the picture are moving. Objects in the video portion may be moving every frame (since there are no repeated frames), but objects in the film portion will be moving only upon presentation of each new frame.

Modern LCD TVs often implement high quality motion-compensated FRC on board, which delivers higher picture quality than the broadcast FRC with pull-down. FIG. 1 illustrates an exemplary FRC block. The input signal is analysed by a cadence detector 10. The cadence detector classifies frames into new frames and repeated frames, where repeat frames are the copies of the new frames in the film cadence. A translator 20 assigns to each frame two time stamps: the capture time stamp (CTS) and presentation time stamp (PTS). The CTS corresponds to the order of frame acquisition from the input signal. The CTSs are usually denoted by integer numbers. Observe that in the case of film cadence, the differences between the CTSs of consecutive new frames may vary. For example, for 3:2 pull-down these differences alternate between 3 and 2. However, it is assumed that the new film frames were shot by a camera at equidistant time intervals. This assumption is almost always true, in practice. Therefore, the CTSs do not represent the actual frame acquisition times at the camera. For MC FRC, it is beneficial to have good correspondence between the time stamps allocated to the frames for the purposes of motion estimation and/or interpolation and the true frame acquisition times at the camera. The PTSs are introduced to establish this correspondence. The PTSs are derived from the CTSs and they correspond to the hypothetical moment of the frame acquisition given the assumed equal time distance between all new frames. An example scenario is illustrated in Table 1 for a sequence of 8 frames exhibiting 3:2 pulldown.

TABLE 1

| Frame Type | New | Repeat | Repeat | New | Repeat | New | Repeat | Repeat |
|---|---|---|---|---|---|---|---|---|
| CTS | 1 | 2 | 3 | 4 | 5 | 6 | 7 | 8 |
| PTS | 1.5 | 1.5 | 1.5 | 4 | 4 | 6.5 | 6.5 | 6.5 |

If the input content is video then the PTS is simply equal to CTS. In the case of film content the PTSs can be non-integral; and the PTSs of a new frame and its duplicates are identical. The translator 20 supplies the PTSs to the MC FRC unit 30, which places (in a virtual sense) the new frames on a time axis according to their PTSs and performs interpolation, using the new frames as reference frames, to synthesise frames for the desired time positions corresponding to the output.

In addition to PTSs, the translator 20 sends the MC FRC unit 30 a flag which tells it whether to perform motion compensation (that is, to function in interpolation mode), or to function in a fallback mode, where the motion compensated FRC is replaced by simple FRC via frame repetition or pull-down. In the latter case, the translator generates PTSs equal to the corresponding CTSs. Even if the translator indicates that motion compensation is to be used, the MC-FRC unit may still choose to operate in fallback mode if the estimated quality of the motion vectors is low.

The fallback flag can be set based on the cadence identified by the cadence detector 10. If the detected cadence is a film cadence, then the translator derives PTSs according to the detected pull-down pattern and the MC FRC unit operates in interpolation mode. Similarly, if the cadence is video cadence, the PTSs are equal to the CTSs and motion-compensated interpolation can again be activated. If hybrid cadence is detected, the fallback flag is set and the MC FRC unit operates in fallback mode, without proper interpolation (instead, merely duplicating frames to achieve the desired frame rate). Fallback mode might also be activated by the MC FRC unit itself—for example, if it is able to determine that the quality of estimated motion vectors is so poor that motion compensated interpolation would be unreliable.

When the MC FRC unit operates in fallback mode, the viewer may have the impression of motion blur in regions of video content and judder in film content. (Judder is also sometimes also known as jitter). Both effects are undesirable.

It is also possible that misclassifications occur at the cadence detector, such that the detected cadence does not match the true cadence. This will result in similar visual disturbance for the viewer.

As an alternative to simply operating in fallback mode when hybrid content is detected, it is also known to process the multiple detected cadences independently. For example, a first set of blocks identified as having the cadence of video and a second set identified as having film cadence can be motion-compensated separately. The individual interpolated blocks can then be re-combined to produce the desired interpolated frames. However, a drawback is that it is more difficult to reliably detect cadence on a local scale, in such small blocks. Therefore, the results of the classification by the local cadence detector may be more prone to error. Coupled with this, disturbing artefacts may be visible at the boundaries between blocks that have been processed using different detected cadences—especially where classification errors have been made.

According to an aspect of the invention, there is provided a method of generating presentation time stamps, PTSs, for motion-compensated frame-rate conversion of a sequence of frames at least some of which are new frames, each frame of the sequence having an associated capture time-stamp, the method comprising for each new frame: determining an average difference between the capture time-stamps of recent consecutive new frames; and generating the PTS based on the capture time-stamp of a previous new frame and the average difference.

The PTSs for each repeat-frame can be set equal to that of the corresponding new frame which it duplicates, as usual. The method of this aspect of the invention synchronises the presentation time stamp of each new frame to the capture time stamp of a previously detected new frame. This technique helps to increase the number of original frames present in the output, although the precise number of original frames preserved will also depend on the rate conversion factor and any phase shift between the generated presentation time stamps and the timing of the output frames to be synthesised. For integer conversion factors and with no phase shift, for example, methods according to the invention can ensure that at least every second new frame is preserved in the output. The method extrapolates from the synchronisation time stamps using a measure of the average interval between new frames in the recent history of the sequence. This average spacing should tend to correspond to the true interval between the new frames when originally shot by the camera. The method can provide a consistent, general approach to generating the PTSs for all types of cadence. For video, it correctly returns the CTS of each frame. For regular (periodic) as well as irregular (a-periodic) film cadences, it generates PTSs so that frames are distributed as equidistantly as possible on the time axis. Because the same generic formula can be used for diverse cadences, it can reduce visible switching artefacts at time instants when the cadence changes. Instead, it provides a smooth transition between these different patterns. In addition, as will be discussed in greater detail below, the approach is amenable to the derivation of intermediate PTSs for hybrid content that offer a potentially better viewing experience than can be achieved by a hard decision between film cadence and video cadence for motion compensation, or by using a fallback mode.

The PTS for a current new frame may be based on the PTS of the most recent previous new frame or the capture time-stamp of the most recent previous new frame; the capture time stamp of the current new frame; and the average difference.

Note that the PTS of the most recent previous new frame will itself have been generated based on the capture time-stamp of some other preceding new frame. Thus, the generated PTS will always be based on the capture time stamp of at least one preceding new frame, either by recursion, or directly.

The method may further comprise ensuring that the generated PTS for each frame is greater than or equal to the capture time-stamp of that frame.

Enforcing a minimum value of PTS=CTS is a convenient way of ensuring causality in the system—the requirement that frames are not presented before they are available. It is advantageous in that it results in frames that are delivered "late" being presented immediately, while frames that are delivered "early" are delayed as little as possible. This assists in reducing the overall latency of the system. In this context, "late" and "early" refer to the arrival of frames in an asymmetric cadence such as 3:2. Here, for example, the frame that is repeated twice arrives "late" because it arrives three frames after the preceding new frame. The frame that is repeated three times arrives "early" because it arrives two frames after its preceding new frame. (Note that the true frame interval at the camera is 2.5 and this is also the average difference between new frames in the 3:2 cadence).

The method may further comprise ensuring that the generated PTS does not to exceed a predetermined maximum latency.

In this variation, a maximum threshold latency is set and a PTS cannot be delayed relative to the CTS by more than this duration.

Preferably, for irregular film cadences and cadence transitions, the generated PTS of at least every second new frame is equal to the capture time stamp of that frame.

Irregular refers to a cadence which is not periodic (or in which the periodicity has not yet been determined by the cadence detector). A cadence transition is simply a change from one pattern of repeated frames to another.

The method preferably comprises: detecting a first cadence, corresponding to a first pattern of occurrence of new frames and repeated frames, in a first spatial area of the sequence; and detecting a second cadence, corresponding to a second pattern of occurrence of new frames, in a second, different spatial area of the sequence, wherein the PTSs are generated for each of the new frames of the first pattern according to the first detected cadence, the method further comprising modifying said PTSs by biasing them toward the capture time stamp of the nearest new frame of the second pattern according to the second detected cadence.

In this method, the presence of hybrid content is detected, wherein part of the frame has a first cadence (for example, a film cadence) and part of the frame has a second cadence (for example, a video cadence or a different film cadence). PTSs should be assigned to the frames such that all frames used for motion compensation are unique according to both cadences. In other words, if two frames are assigned different PTSs then they must not have been classified as repeats in either of the cadences. The PTSs are generated only for the new frames defined by the first pattern and are generated using the principle described above, based on the CTS of a preceding new frame and the average difference between new frames. However, the resulting PTS for each new frame is adapted by rounding it toward the capture time stamp of the nearest new frame according to the second pattern. When the second cadence is a video cadence (in which every frame is a new frame), this adaptation will simply comprise reducing non-integral PTS values toward their next lowest integer. The modification tends to bring the PTSs toward the values for the corresponding frames according to the second cadence. Thus a PTS is generated for each hybrid frame that is between the PTS of the basic method according to the first cadence and the PTS that would be generated using the second cadence. This allows motion compensation to be applied to hybrid frames. It is not necessary to segment the different parts of the frames or process them separately. At the same time, a compromise can be achieved in the temporal interpolation, between the distortion caused to the film and video parts of the hybrid frames. It has been found that such a compromise may be less visually disturbing than the artefacts observed when selecting PTSs of exclusively one cadence or the other.

According to a second aspect of the invention, there is provided a method of generating presentation time stamps, PTSs, for motion-compensated frame-rate conversion of a sequence of frames at least some of which are new frames, the method comprising for each frame: detecting a first cadence, corresponding to a first pattern of occurrence of new frames in a first spatial area of the sequence; detecting a second cadence, corresponding to a second, different pattern of occurrence of new frames in a second, different spatial area of the sequence; and generating a PTS for each new frame defined by the first pattern, such that in each case the difference between the PTSs of consecutive new frames is intermediate between the true interval between those frames according to the first cadence and the true interval between them according to the second cadence.

In hybrid frames having two cadences, a compromise is achieved by generating PTSs for the new frames of the first cadence/pattern, but relaxing the assumption that these frames must be presented at equidistant intervals according to that first cadence. Thus, the PTSs are positioned on the time axis to give intervals of intermediate length—in between the true intervals for the first cadence and those for the second cadence. Here, "true" interval refers to the interval between the new frames as they were captured by the camera. Although the new frames are selected by reference only to the first cadence, the corresponding PTSs are generated so as to take into account the true intervals for the second spatial area, where the frames have the second cadence. This means that the motion compensation will not be perfect for either of the two different parts of the frame, but should instead be of reasonable quality for both.

According to a third aspect of the invention, there is provided a method of motion-compensated frame rate conversion, for a sequence of frames at least some of which are new frames, each frame of the sequence having an associated capture time-stamp, the method comprising generating PTSs; selecting a reference frame for each PTS; obtaining motion vectors for each reference frame, describing transformations between that reference frame and the next, based on the generated PTSs; and synthesising frames for presentation between consecutive reference frames, by interpolation using the motion vectors.

Also provided is time-stamp translator apparatus, for generating presentation time stamps, PTSs, for motion-compensated frame-rate conversion of a sequence of frames at least some of which are new frames, each frame of the sequence having an associated capture time-stamp, the translator adapted to, for each new frame: determine an average difference between the capture time-stamps of recent consecutive new frames; and generate the PTS based on the capture time-stamp of the previous new frame and the average difference.

According to a further aspect, there is provided frame rate conversion, FRC, apparatus for frame rate conversion of a sequence of frames at least some of which are new frames, each frame of the sequence having an associated capture time-stamp, the apparatus comprising: a translator and a motion-compensated FRC unit. The FRC unit is adapted to: receive PTSs generated by the translator; select a reference frame for each PTS; obtain motion vectors for each reference frame describing transformations between that reference frame and the next based on the generated PTSs; and synthesise frames for presentation between consecutive reference frames by interpolation using the motion vectors.

The invention will now be described by way of example with reference to the accompanying drawings, in which.

Figure 1:
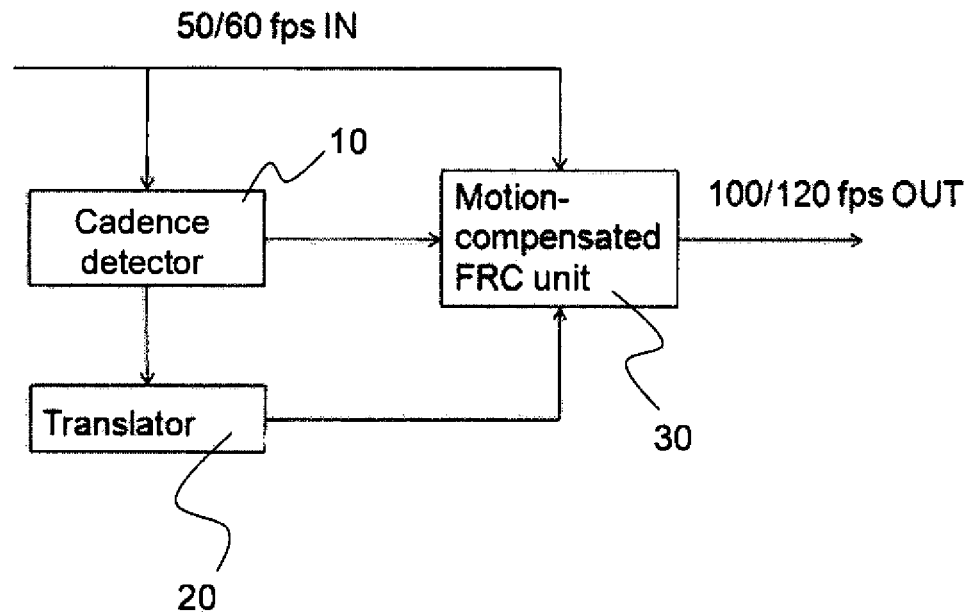
FIG. 1 shows a block diagram of a FRC apparatus suitable for a TV.

There is a certain amount of freedom in the definition of the PTSs. Table 2 illustrates two valid definitions of PTSs for 3:2 film pull-down. In both definitions the time interval between PTSs for consecutive new frames are the same and equal to 2.5.

TABLE 2

| Frame Type | New | Repeat | Repeat | New | Repeat | New | Repeat | Repeat |
|---|---|---|---|---|---|---|---|---|
| CTS | 1 | 2 | 3 | 4 | 5 | 6 | 7 | 8 |
| $PTS_1$ | 1.5 | 1.5 | 1.5 | 4 | 4 | 6.5 | 6.5 | 6.5 |
| $PTS_2$ | 1 | 1 | 1 | 3.5 | 3.5 | 6 | 6 | 6 |

In a real MC-FRC unit, this freedom is limited by a number of practical considerations. For example, since the memory buffer is limited, the total video processing delay is limited and should be minimized. Due to latency constraints, the translator is usually not allowed to use "future" frames when deriving time stamps for the current frame, because this would imply additional delay—the generation of PTS for frame i would have to wait until frame i+N had arrived. Therefore, when a time stamp is generated, it is preferable that only information derived from the current and previous frames is used. Another source of constraints is the throughput of MC FRC. Since the processing power of the MC FRC unit is limited and the quality of the interpolated frames is in general lower than the quality of the originals, the number of interpolated frames per time unit is also limited and should be minimized (or, in other words, the number of non-interpolated frames should be maximized).

The generation of the PTSs is especially complicated in the case of irregular pull-down and pull-down transitions. The translator has to fulfil the constraints when generating the PTSs, while also trying to place them on the time axis as equidistantly as possible. Some prior art approaches make no attempt to control the number of original—that is, non-interpolated—frames in the output of the MC-FRC. However, embodiments of the present invention address this drawback.

In one embodiment of the invention, the following generic computational formula is used to generate PTSs. This covers the cases of regular pull-down, irregular pull-down and pull-down transitions (for film material). It is also consistent with the simple formula of $PTS_i=CTS_i$, for the case of video material.

$$PTS_i = \begin{cases} CTS_i + \max\left(0, \min\left(\begin{array}{c} M, PTS_{n(i,-1)}^{sync} - \\ CTS_i + \tau(i,d) \end{array}\right)\right), & \text{if type}(i) =" \text{new}" \\ PTS_{n(i,-1)}, & \text{if type}(i) =" \text{repeat}" \end{cases}$$

$$M = \min(Th, \tau(i,d)),$$

$$\tau(i,d) = d \Big/ \sum_{j=0}^{d-1} 1_{\{type(i-j)=" new"\}}$$

Here Th is the latency threshold. n(i,-k) denotes the position of the $k^{th}$ "new" frame before frame i. Thus, n(i,-1) is the index of the previous new frame before frame i, and n(i,-2) is the new frame before that. For regular film, d is the period length, and for the state irregular, it is defined as d=i-n(i,-2). The synchronization time stamp is defined as $PTS_{n(i,-1)}^{sync}=CTS_{n(i,-1)}$ for irregular cadences and also for the first frame in which regular film cadence is detected. Then, for subsequent frames of regular film, $PTS_{n(i,-1)}^{sync}=PTS_{n(i,-1)}$. $\tau(i,d)$ is the average distance between the "new" frames within the last d frames.

The formula tries to maximize the number of original frames preserved in the output on irregular cadences and pull-down transitions, and gives equidistant PTSs in the case of regular film cadences. It calculates the PTS based on the synchronization time stamp and the average difference between the CTS of successive new frames in the recent past. The average difference approximates the true interval between frames when they were captured by the camera. In particular, the PTS is set equal to the sum of the synchronization time stamp and average difference, provided certain other conditions are met. The first condition is that the minimum value of PTS is the CTS. This represents a constraint that frames are not to be presented before they are captured from the input signal. Secondly, the PTS cannot lag the CTS by more than the latency threshold.

As defined by the formula, the PTSs of successive repeated frames are equal. However, according to the embodiment, the choice of reference frame to be associated with this PTS in the motion compensation process is not arbitrary. Known FRC algorithms automatically choose the first frame of each group of repeated frames as the reference frame. However, the inventors have recognised that this causes unnecessarily large errors, when misclassifications occur and in the case of hybrid content. If video or hybrid content is misinterpreted as film then the frames detected as "repeats" in fact contain different frames of video content. In order to minimize artefacts in video areas due to motion compensation based on the film cadence, the present embodiment selects reference frames that have a CTS value closest to the above newly calculated PTS value. For example a PTS value of 6.25 implies that the input (original) frame with a CTS value of 6 should be selected as the reference frame.

If the state of the film cadence detector is hybrid then, in contrast to known MC-FRC translators, the method of this embodiment continues to perform MC interpolation. In order to have a seamless transition between 'film', 'hybrid' and 'video' modes, and to obtain an optimal compromise between judder in film and video areas, the PTSs in hybrid mode are defined as follows:

$$PTS_j^h = \alpha PTS_j + (1-\alpha)\lfloor PTS_j\rfloor,$$

where $PTS_j$ are PTSs computed by the formula above for film/irregular, and $\alpha\in[0,1]$ is a dynamic parameter determining the a transition or trade-off from 'film' to 'video'. The choice of alpha value should take into account the perceptual aspects of video and film judder. This can be based, at least partially, on a theoretical judder which can be calculated as the deviation of the actual PTS value and the optimal one in areas of each cadence. As judder in video is typically more visually disturbing for the viewer than judder in film, this can be emphasized in the trade-off such that an alpha value is chosen that gives preference to video. Hence, a compromise can be achieved that balances both judder values.

Note that a fixed choice, such as $\alpha=0.5$, may be acceptable, but does not necessarily achieve this balance universally. Preferably, the mixing parameter $\alpha$ can be defined as function of the visibility of the film pattern in the video signal and the frame difference between the last two frames classified as frame repeats.

Several known cadence detectors provide a measure of visibility, which can also be considered to be a confidence measure in the extent to which the material in the frame is film content. This can be defined based on the pattern of inter-frame differences in the sequence. By way of example, for a frame n, the visibility p(n) of film content can be defined as the minimum of the inter-frame differences above a given threshold T minus the maximum of the differences below threshold T in the previous K frames (before frame n). For example, one possible formula is as follows:

$$p(n) = \begin{cases} 0, & \text{if } |\{\log(D_{n-i}) \geq T \mid 0 \leq i < K\}| = 0 \\ & \text{or } |\{\log(D_{n-i}) < T \mid 0 \leq i < K\}| < 2 \\ \left(\min_{\substack{0 \leq i < K \\ D_{n-i} > T}} \log(D_{n-i})\right) - & \\ \left(\max_{\substack{0 \leq i < K \\ D_{n-i} < T}} \log(D_{n-i})\right), & \text{otherwise} \end{cases}$$

Here T is a static or dynamic threshold corresponding to average inter-frame difference, K is the number of differences considered, $D_k$ are the inter-frame differences and the logarithm is used to effectively compress the dynamic range of $D_k$. The notation |{ ... }| indicates the cardinality (number of elements) of the set { ... } According to the formula, p(n)=0 if there are no differences above threshold T or if the number of differences below threshold T is fewer than 2.

Figure 2:
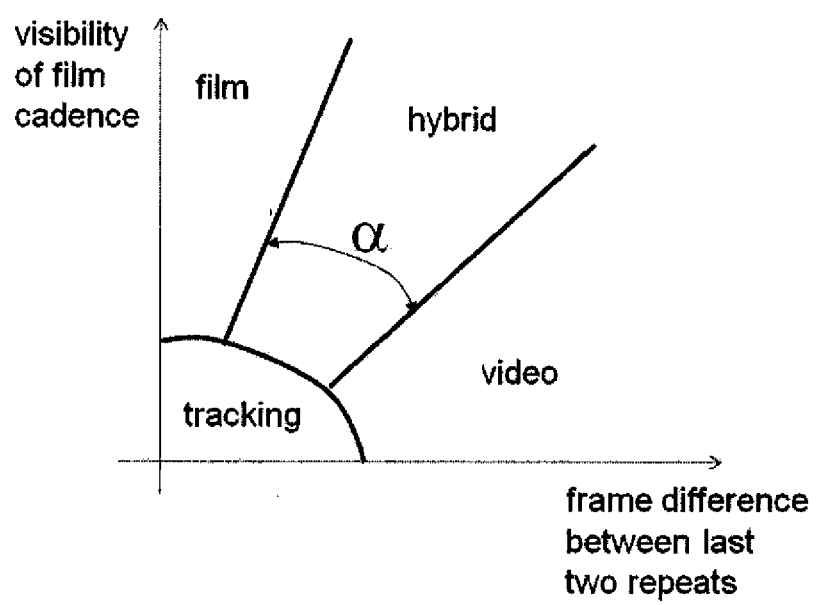
FIG. 2 illustrates one way of choosing a parameter, alpha, for achieving a compromise between the presentation time of film and video content in a hybrid sequence, according to an embodiment.

An example definition of alpha, which adapts based on both visibility and frame-difference, is illustrated in FIG. 2. This could be implemented by means of a two dimensional lookup table in practice, or parameterised appropriately. Alternatively, a functional definition of alpha may be used. One example is as follows:

$$\alpha_{n+1} = \begin{cases} nclip\left(\arctan\frac{p(n)}{F_{diff}}\right), & \text{if } |p(n)| > C_3 \text{ and } |F_{diff}| > C_3 \\ \alpha_n, & \text{otherwise} \end{cases}$$

$$nclip(x) = \begin{cases} 1, & \text{if } x \geq C_1 \\ \dfrac{x - C_2}{C_1 - C_2}, & \text{if } C_2 < x < C_1 \\ 0, & \text{if } x < C_2 \end{cases}$$

Here $F_{diff}$ is the frame difference between the last two frames classified as frame repeats. The frame difference could be determined by a variety of suitable methods, as will be apparent to those skilled in the art. By way of example, the frame difference may be a sum of pixel-wise differences between current and previous frames. $C_1$, $C_2$ and $C_3$ are constant parameters which can be used to tune the system.

The formula for hybrid content has the effect that, although the frames selected as new frames are those of the film cadence, the presentation times of these frames are adapted from their "normal" presentation times according to the basic formula for film and irregular cadences. More specifically, they are adapted towards the presentation times for the other cadence (the video cadence, in this case). The parameter, alpha, controls the degree of variation. When alpha=0, the PTS for video is returned. When alpha=1 the PTS for film is returned. With intermediate values of alpha, this means that the frames are being positioned on the time axis such that they are neither perfectly placed for motion compensation of the video areas, nor for perfect motion compensation of the film/irregular areas. Instead, a compromise is achieved. As will be discussed in greater detail below, it has been found that this compromise may offer better perceptual results than simply choosing between one cadence and the other. At the same time, the formulas above give a simple and consistent way to produce PTSs offering this compromise.

The outcome is that the intervals between the PTSs of successive new frames are perturbed from their true values (where "true" is defined by the intervals they would have had when initially captured at a camera). This is true of both areas (film/irregular and video) of the hybrid frames.

For hybrid content, all frames that contain repeated film content have the same PTS value. The proposed MC FRC selects the reference frames by rounding the PTS values to the closest CTS value (that is, the nearest integer), just as in film/irregular mode. As noted previously above, if the state of the cadence detector is video then the PTSs are simply equal to CTS and the FRC functions in the interpolation mode.

Figure 3:
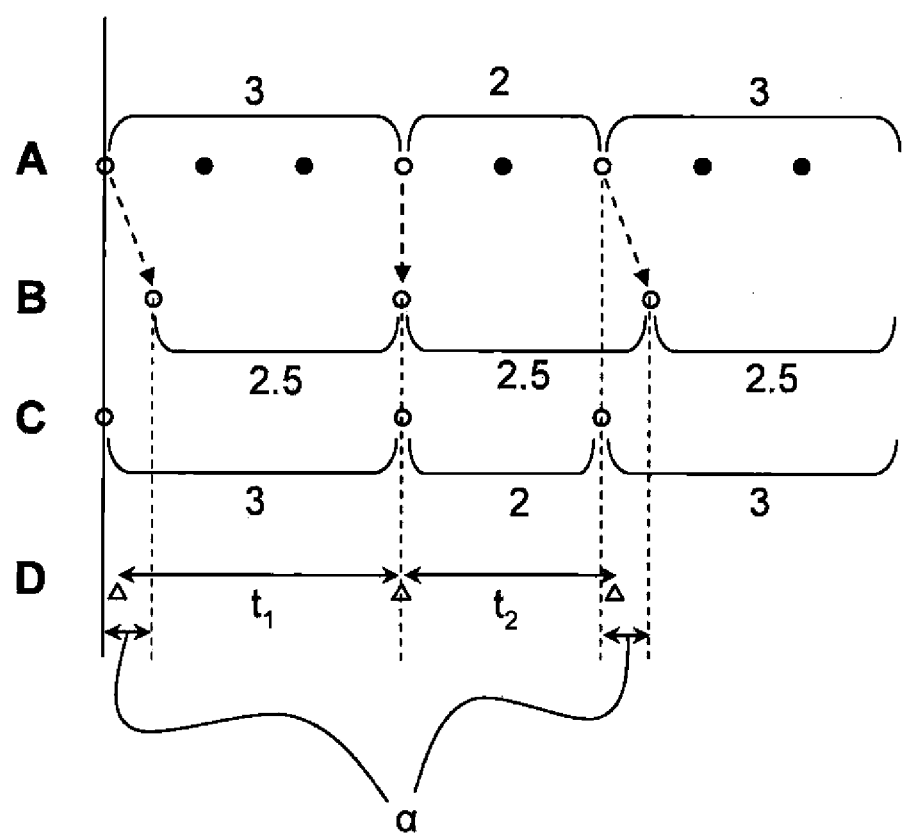
FIG. 3 illustrates presentation time stamps of frames of hybrid material according to an embodiment.

FIG. 3 shows an example of how the formulae work in practice. In this simple example, the hybrid content includes a first spatial area consisting of film content with 3:2 cadence; and a second spatial area with video cadence. Row A of FIG. 3 shows the pattern of input frames. The open circles are the new frames of the film sequence, while the black dots represent the repeat frames. Note that, in the spatial area containing video material, every frame is a new frame. The method uses the new frames determined according to the film cadence. These frames are shown in rows B and C of FIG. 3. Row B shows the positions of the output (PTS) for the 3:2 film material. Successive new film frames would be presented at regular intervals of 2.5 frames. Row C shows the positions of the output if the PTS were chosen according to the video part of the frame. Here, because PTS=CTS, the intervals between the video frames alternate between 3 and 2 frames. Thus, row B illustrates a PTS selection that is optimised for the film part of the frame while row C illustrates a set of PTSs optimised for the video part.

According to the embodiment, the output PTSs for the hybrid content will be generated as shown in row D (indicated by the open triangles). Depending on the value of alpha, each PTS will be positioned somewhere in between the corresponding PTS in row B (film cadence) and the corresponding PTS in row C (video cadence). That is, the PTS takes an intermediate value in each case. The value of alpha shifts the triangles between the limits of the dashed vertical lines shown in FIG. 3. This is shown for the first and third new frames (PTSs). Note that, for the second PTS, there is no flexibility, because in this case the PTS for the video is identical to the PTS for film.

The intervals between presentations of successive frames are also intermediate between the true intervals corresponding to each cadence. Thus, the first interval t1 is between 2.5 (true for film cadence) and 3 (true for video cadence). The second interval t2 is between 2 (video cadence) and 2.5 (film cadence).

Although the example of FIG. 3 is very simple, an advantage of the two formulae is that they allow smooth and consistent handling of much more complex cadences and combinations of cadences—including cadence transitions and irregular cadences. Nonetheless, FIG. 3 illustrates the basic principle of compromise between the true presentation times of each of two cadences present in the frames, to choose intermediate presentation intervals.

Note that, during the motion compensation and interpolation stages, the entire area of each frame will be treated the same—there is a single set of PTSs, a single set of reference frames and a common interpolation process for both the film and video parts. This avoids the need to segment the frames and apply independent motion compensation based on independent reference frames or PTSs. There is therefore no need to vary the motion compensation and interpolation processes. Indeed, conventional techniques well known to the skilled person can be used in these steps.

Figure 4:
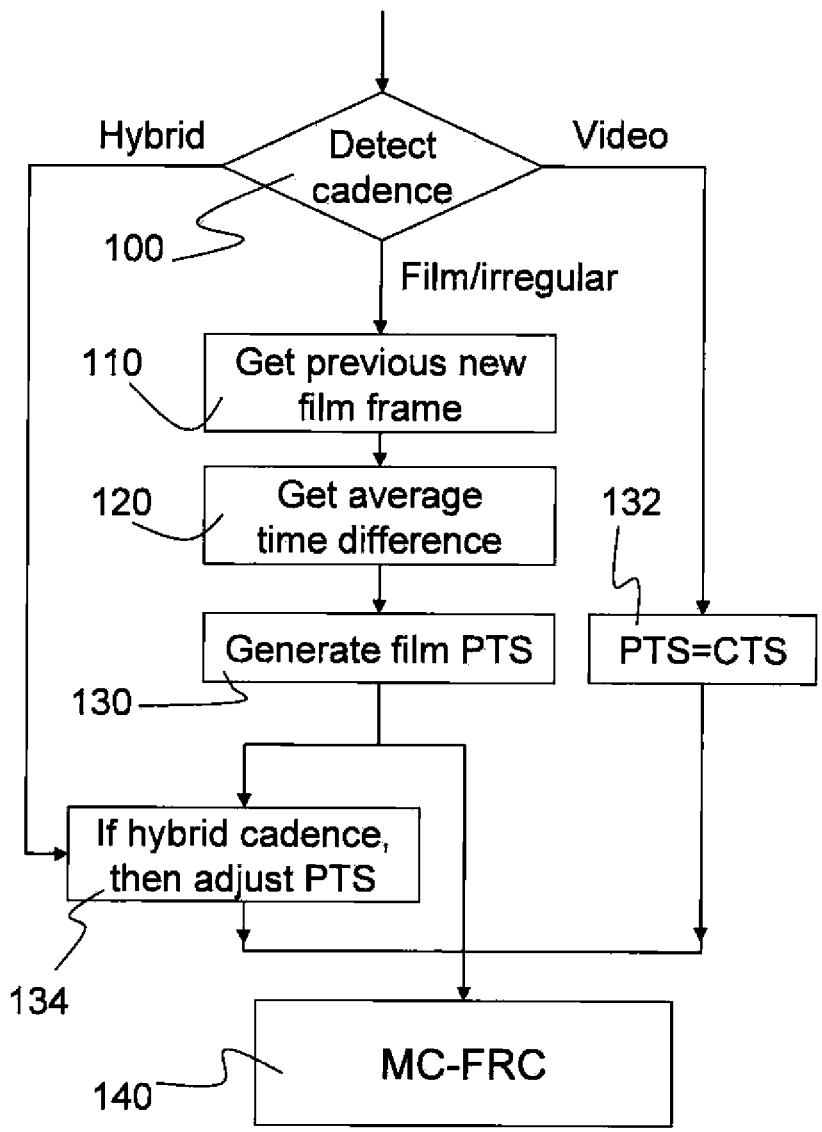
FIG. 4 is a flowchart describing a method according to an embodiment.

FIG. 4 summarises a method according to an embodiment. In step 100, the cadence (or cadences, for hybrid content) of input frames is (are) detected. If a film or irregular type cadence is detected, then the first formula above is used to derive the PTSs. This comprises finding the synchronization time stamp, which is the CTS of the preceding new film frame (step 110) and calculating the average time interval between new frames according to the detected cadence (step 120). In step 130, a PTS is generated for each frame based on these two values. If the content of the frame sequence is detected as hybrid content, then the film/irregular PTS generated in step 130 is adjusted in step 134 according to the second equation above. Meanwhile, if the frame sequence consists of only video material, the PTS is set equal to CTS, in step 132. In each case, the generated PTSs are then used, in step 140, to perform motion-compensated frame-rate conversion.

In the following, the theoretical improvements obtainable by using a MC-FRC method according to an embodiment will be discussed.

Consider, for example, an embodiment comprising MC-FRC of 60 Hz hybrid content to 120 Hz. Assume that the prior-art MC-FRC block can work in 3 different modes: film, video (including motion compensation) and fallback (no motion compensation—simple frame repetition). The processing of film areas in the video and the fallback modes and processing of video areas in the film and the fallback mode cause the original and interpolated frames to be displayed at shifted temporal positions. Since these temporal shifts of the output frames are periodic, they are perceived as judder at low frequencies and motion blur at high frequencies. This is summarised in Table 3, which shows the amplitude and the dominating frequency of the judder due to mismatch of the content and the processing mode in the prior art MC-FRC. Judder magnitude is expressed in milliseconds and its frequency in Hertz. The drawbacks of misclassification are clearly visible here are, discussed previously above.

TABLE 3

| | | FRC translator mode | | |
|---|---|---|---|---|
| | | Film or Irregular | Fallback | Video |
| Actual content | Film areas | 0 | 41.66 ms/12 Hz | 33.3 ms/24 Hz |
| | Video areas | 8.33 ms/12 Hz | 8.33 ms/60 Hz | 0 |

From Table 3, it can be seen that for film areas the erroneous processing in the video mode is preferably to the fallback mode; while for video areas the erroneous processing in the fallback mode is preferable to the film mode. (These preferences are based on an assumption that smaller magnitudes and higher frequencies of judder are less disturbing.) This makes the design of the switching rules between the different processing modes challenging. Moreover, for film areas, the switching between correct and erroneous modes is quite noticeable due to high level of judder.

Tables 4A-4C below show the judder when using MC-FRC according to the embodiment described previously above. The fallback mode of the prior art is replaced by a hybrid mode with very moderate judder. Notably, it can be seen that for both film and video areas erroneous processing in the hybrid mode is beneficial (for α≥0.7) as compared with erroneous processing in either the video and film modes. This simplifies the design of switching between the processing modes, since it is always preferably to process the problematic content in the hybrid mode.

TABLE 4A

| | | FRC translator mode | | |
|---|---|---|---|---|
| | | Film or Irregular | Hybrid, Film optimal α = 0 | Video |
| Actual content | Film areas | 0 | 0 | 33.3 ms/24 Hz |
| | Video areas | 8.33 ms/12 Hz | 8.33 ms/12 Hz | 0 |

TABLE 4B

| | | FRC translator mode | | |
|---|---|---|---|---|
| | | Film or Irregular | Hybrid, Video optimal α = 1 | Video |
| Actual content | Film areas | 0 | 8.33 ms/12 Hz | 33.3 ms/24 Hz |
| | Video areas | 8.33 ms/12 Hz | 0 | 0 |

TABLE 4C

| | | FRC translator mode | | |
|---|---|---|---|---|
| | | Film or Irregular | Hybrid, compromise α = 0.7 | Video |
| Actual content | Film areas | 0 | 5.83 ms/12 Hz | 33.3 ms/24 Hz |

TABLE 4C-continued

| | | FRC translator mode | | |
|---|---|---|---|---|
| | | Film or Irregular | Hybrid, compromise α = 0.7 | Video |
| | Video areas | 8.33 ms/12 Hz | 2.5 ms/12 Hz | 0 |

The above achievements in the case of 60 Hz hybrid MC-FRC to 120 Hz can be generalized as shown in Table 5,

TABLE 5

| | | FRC translator mode | |
|---|---|---|---|
| | | Fallback mode | New hybrid mode |
| Actual content | Film or Irregular | Full film judder | Small film judder |
| | Hybrid | Full judder in film areas and motion blur in video areas | Small judder in film areas and small judder in video areas |
| | Video | Motion blur | Hardly noticeable judder in video areas |

While the invention has been illustrated and described in detail in the drawings and foregoing description, such illustration and description are to be considered illustrative or exemplary and not restrictive; the invention is not limited to the disclosed embodiments.

For example, as an alternative, or in addition, the fallback flag may be generated by the cadence detector 10 and provided directly to the MC FRC unit 30. The cadence detector may also provide a scene-change flag to the MC FRC unit. In the event of a scene-change, two consecutive frames of the sequence will be originating from two different scenes. In this case, performing motion compensation would be incorrect and could create visually disturbing artefacts. Preferably, therefore, the MC-FRC unit will be disabled at scene changes, and any recursive processing in the unit (such as a recursive motion estimation) will be reset.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:
1. A method of generating presentation time stamps, for motion-compensated frame-rate conversion of a sequence of frames at least some of which are new frames, each frame of the sequence having an associated capture time-stamp, the method comprising for each new frame:
    determining an average difference between capture time-stamps of recent consecutive new frames; and generating a presentation time stamp for said new frame based on the capture time-stamp of a most recent previous new frame and the average difference.

2. The method of claim 1, wherein the generation of the presentation time stamp for said new frame is further based on:
one of a presentation time stamp of the most recent previous new frame and a capture time-stamp of the most recent previous new frame,
the capture time stamp of the current new frame, and
the average difference.

3. The method of claim 2, further comprising ensuring that:
the presentation time stamp that is generated for each frame is greater than or equal to the capture time-stamp of said frame; or
the presentation time stamp that is generated does not to exceed a predetermined maximum latency.

4. The method of claim 3 wherein, for irregular film cadences and cadence transitions, the generated presentation time stamp for at least every second new frame is equal to the capture time stamp of said frame.

5. The method of claim 4, comprising: detecting a first cadence, corresponding to a first pattern of occurrence of new frames and repeated frames, in a first spatial area of the sequence; and detecting a second cadence, corresponding to a second pattern of occurrence of new frames, in a second, different spatial area of the sequence,
wherein the presentation time stamps are generated for each of the new frames of the first pattern based on the first detected cadence,
and modifying said presentation time stamps by biasing them toward the capture time stamp of a nearest new frame of the second pattern based on the second detected cadence.

6. The method of claim 4 comprising:
detecting a first cadence, corresponding to a first pattern of occurrence of new frames in a first spatial area of the sequence; and
detecting a second cadence, corresponding to a second, different pattern of occurrence of new frames in a second, different spatial area of the sequence,
wherein a presentation time stamp is generated for each new frame defined by the first pattern, and for each pair of consecutive new frames, a difference between the presentation time stamps of the new frames in said pair is intermediate between a true interval between said new frames in said pair based on the first cadence and a true interval between said new frames in said pair based on the second cadence.

7. A method of generating presentation time stamps for motion-compensated frame-rate conversion of a sequence of frames including new frames and repeated frames, the method comprising:
detecting a first cadence, corresponding to a first pattern of occurrence of new frames in a first spatial area of the sequence;
detecting a second cadence, corresponding to a second, different pattern of occurrence of new frames in a second, different spatial area of the sequence; and
generating a presentation time stamp for each new frame defined by the first pattern, wherein for each pair of consecutive new frames, a difference between the presentation time stamps of the new frames in said pair is intermediate between a true interval between said new frames in said pair based on the first cadence and a true interval between said new frames in said pair based on the second cadence;
wherein the presentation time stamp that is generated for each of the new frames is greater than or equal to the capture time stamp of said frame.

8. A method claim 7 further comprising:
selecting a reference frame for each presentation time stamp;
obtaining motion vectors for each reference frame, describing transformations between said reference frame and the next, based on the generated presentation time stamps; and
synthesizing frames for presentation between consecutive reference frames, by interpolation using the motion vectors.

9. The method of claim 8, wherein the reference frame selected for each generated presentation time stamps is the frame having a capture time-stamp that is most nearly equal to the presentation time stamps.

10. A non-transitory computer readable device storing instructions adapted to be executed to implement a method for generating presentation time stamps for motion-compensated frame-rate conversion of a sequence of frames at least some of which are new frames, each frame of the sequence having an associated capture time-stamp, the method comprising for each new frame:
determining an average difference between capture time-stamps of recent consecutive new frames; and
generating a presentation time stamp for said new frame based on the capture time-stamp of a most recent previous new frame and the average difference.

11. A non-transitory computer readable device storing instructions adapted to be executed to implement a method of generating presentation time stamps for motion-compensated frame-rate conversion of a sequence of frames including new frames and repeated frames, the method comprising:
detecting a first cadence, corresponding to a first pattern of occurrence of new frames in a first spatial area of the sequence;
detecting a second cadence, corresponding to a second, different pattern of occurrence of new frames in a second, different spatial area of the sequence; and
generating a presentation time stamp for each new frame defined by the first pattern, wherein for each pair of consecutive new frames, a difference between the presentation time stamps of the new frames in said pair is intermediate between a true interval between said new frames in said pair based on the first cadence and a true interval between said new frames in said pair based on the second cadence;
wherein the presentation time stamp that is generated for each of the new frames is greater than or equal to the capture time stamp of said frame.

12. A frame rate conversion apparatus, for frame rate conversion of a sequence of frames at least some of which are new frames, each frame of the sequence having an associated capture time-stamp, the apparatus comprising:
a translator apparatus that generates presentation time stamps for motion-compensated frame-rate conversion of a sequence of frames at least some of which are new frames, each frame of the sequence having an associated capture time-stamp, by determining an average difference between the capture time-stamps of recent consecutive new frames, and generating a presentation time stamp for each new frame based on a capture time-stamp of a most recent previous new frame and the average difference; and a motion-compensated frame rate conversion unit that:
   receives presentation time stamps generated by the translator;
   selects a reference frame for each presentation time stamp;
   obtains motion vectors for each reference frame, describing transformations between said reference frame and the next reference frame, based on the generated presentation time stamps; and
   synthesizes frames for presentation between consecutive reference frames, by interpolation using the motion vectors.

* * * * *